US011081931B2

(12) United States Patent
Romeu

(10) Patent No.: US 11,081,931 B2
(45) Date of Patent: Aug. 3, 2021

(54) ROTATING ENERGY STORAGE APPARATUS AND METHOD OF IMPARTING ROTATIONAL MOTION OF A VESSEL CONTAINING THE SAME

(71) Applicant: Alluvionic, Inc., Melbourne, FL (US)

(72) Inventor: Ricardo Romeu, Melbourne, FL (US)

(73) Assignee: Alluvionic, Inc., Melbourne, FL (US)

( * ) Notice: Subject to any disclaimer, the term of this patent is extended or adjusted under 35 U.S.C. 154(b) by 142 days.

(21) Appl. No.: 16/676,007

(22) Filed: Nov. 6, 2019

(65) Prior Publication Data

US 2020/0144887 A1    May 7, 2020

Related U.S. Application Data

(60) Provisional application No. 62/756,143, filed on Nov. 6, 2018.

(51) Int. Cl.
| | |
|---|---|
| *H02K 7/02* | (2006.01) |
| *B60K 6/10* | (2006.01) |
| *B62D 37/06* | (2006.01) |
| *B64G 1/40* | (2006.01) |
| *B63H 21/12* | (2006.01) |
| *B64D 27/24* | (2006.01) |

(52) U.S. Cl.
CPC ............ *H02K 7/025* (2013.01); *B60K 6/105* (2013.01); *B62D 37/06* (2013.01); *B63H 21/12* (2013.01); *B64D 27/24* (2013.01); *B64G 1/409* (2013.01)

(58) Field of Classification Search
None
See application file for complete search history.

(56) References Cited

U.S. PATENT DOCUMENTS

| | | | | |
|---|---|---|---|---|
| 4,719,381 A | * | 1/1988 | Miles ................... | H02K 41/02 310/166 |
| 5,413,010 A | * | 5/1995 | Nakanishi ......... | B01F 15/00435 310/156.38 |
| 5,798,590 A | * | 8/1998 | Sakakibara .......... | H02K 41/031 310/156.19 |
| 2010/0231061 A1 | * | 9/2010 | Van Der Walt ........ | F16M 11/18 310/28 |

(Continued)

*Primary Examiner* — Thomas C Diaz
*Assistant Examiner* — Brian J McGovern
(74) *Attorney, Agent, or Firm* — Daniel C. Pierron; Widerman Malek, PL

(57) ABSTRACT

An energy storage apparatus including a spherical rotating member having permanent magnets and uniquely-identifiable location-defining elements, a plurality of coils, a controller operably coupled to the plurality of coils, a power source, and a location sensing apparatus operable to detect the plurality of location-defining elements. The controller may compare time-sequential information from the location sensing apparatus to determine a rotational axis and a rotational speed of the rotating member, operate the coils to change the rotational axis speed of the rotating member, increase energy stored by the rotating member by increasing the rotational speed by operating the coils to generate magnetic fields that interact with the permanent magnets, and withdraw energy by operating the coils to generate magnetic fields that interact with the magnetic fields of the permanent magnets to produce induced current in the coils and directing the induced current to a power delivery location.

20 Claims, 9 Drawing Sheets

(56) References Cited

U.S. PATENT DOCUMENTS

| | | | |
|---|---|---|---|
| 2013/0113307 A1* | 5/2013 | Kim | H02K 5/04 |
| | | | 310/40.5 |
| 2013/0127285 A1* | 5/2013 | Yano | H02K 41/031 |
| | | | 310/156.43 |
| 2013/0151043 A1* | 6/2013 | Jung | B60B 19/14 |
| | | | 701/22 |
| 2017/0320598 A1* | 11/2017 | Bushroe | B64G 1/283 |
| 2017/0366068 A1* | 12/2017 | Berry | H02K 5/167 |
| 2019/0068041 A1* | 2/2019 | Zhang | H02K 41/0354 |
| 2020/0227989 A1* | 7/2020 | Agrawal | H02K 16/04 |
| 2020/0251941 A1* | 8/2020 | Kaul | H02K 1/26 |
| 2021/0006107 A1* | 1/2021 | Saxena | H02K 1/265 |
| 2021/0021187 A1* | 1/2021 | Mahajan | H02K 41/065 |

\* cited by examiner

ROTATING ENERGY STORAGE APPARATUS AND METHOD OF IMPARTING ROTATIONAL MOTION OF A VESSEL CONTAINING THE SAME

RELATED APPLICATIONS

This application claims priority under 35 U.S.C. § 119(e) of U.S. Provisional Patent Application Ser. No. 62/756,143 filed on Nov. 6, 2018 and titled Rotating Energy Storage Apparatus. The content of this application is incorporated herein by reference.

FIELD OF THE INVENTION

The present invention relates to a rotating energy storage apparatus and a method of operating the same to impart rotational motion and reorient a vessel containing the same.

BACKGROUND OF THE INVENTION

Energy storage on mobile vehicles/vessels has taken many forms. The use of fuels, e.g. substances that undergo a chemical process resulting in the release of energy, are advantageous for their energy density. However, the chemical processes necessary to extract the energy from the fuels frequently entail combustion, which has associated risks of controlling the combustion process and preventing unintentional combustion, which could be catastrophic. Moreover, the processes tend to be one-directional, such that there is no way to store excess energy in fuel-based systems. While some reversible fuels systems exist, such as hydrogen systems that use hydrolysis, such systems are typically large and heavy, making them disadvantageous for use cases where weight and volume are restricted, and the energy efficiency of such processes are typically low.

Batteries are another energy storage solution. While there are many rechargeable batteries available, such batteries are frequently heavy and large, thus suffering from some of the same limitations as reversible chemical processes and attending systems. Moreover, batteries can develop a "memory" which tends to reduce the quantity of energy that can be stored therein, reducing the effectiveness of batteries over time. Additionally, the total amount of energy stored by batteries is comparatively small compared to fuels, thus having an undesirably low energy density ratio.

Flywheels are another energy storage system that have a comparatively high energy density ratio and is completely reversible. However, the fixed rotational axis nature of flywheels means that changes to the rotational speed of the flywheel when storing additional energy or withdrawing energy results in a torque being exerted on the vessel containing the flywheel, which can be disadvantageous in some use cases, particularly satellites needing to maintain a specific angular orientation. Accordingly, there is a need in the art for an energy storage system that can have a variable rotational axis or otherwise counteract undesired torques being applied to the vessel containing the energy storage system.

Accordingly, there is a need in the art for an energy storage system for vessels that has a variable rotational axis or otherwise prevents the unintended exertion of a torque on a vessel containing the energy storage apparatus.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an energy storage apparatus comprising a first rotating member, the first rotating member comprising a first plurality of permanent magnets distributed to define an outer geometry of the rotating member conforming to a spherical shape and a first plurality of location-defining elements, each location-defining element being uniquely identifiable. The energy storage apparatus may further comprise a first plurality of coils arranged to define a generally spherical shape surrounding the first rotating member, a controller operably coupled to the first plurality of coils, a power source operably coupled to the first plurality of coils, and a first location sensing apparatus operable to detect the first plurality of location-defining elements. The controller may be operable to compare time-sequential information from the first location sensing apparatus to determine a rotational axis and a rotational speed of the first rotating member as a combination of rotation about three orthogonal rotational axes. The controller may further be operable to selectively operate the first plurality of coils to change independently each of the rotational axis and the rotational speed of the first rotating member. Furthermore, the controller may be operable to increase energy stored by the first rotating member by increasing the rotational speed of the first rotating member by selectively operating the first plurality of coils to generate magnetic fields that interact with the permanent magnets comprised by first rotating member to increase the rotational speed of the first rotating member. Additionally, the controller may be operable to withdraw energy from the first rotating member by selectively operating the first plurality of coils to generate magnetic fields that interact with the magnetic fields of the first plurality of permanent magnets to produce an induced current in the first plurality of coils and directing the induced current to a power delivery location.

In some embodiments the first rotating member comprises a first center member and a first plurality of arms attached at one end to the center member and extending radially outward therefrom. The first plurality of arms may comprise the first plurality of permanent magnets at an end of each arm opposite the end of the arm attached to the first center member. Additionally, the first plurality of location-defining elements may be positioned on an end surface of the first plurality of arms.

In some embodiments, the energy storage apparatus may further comprise a first housing defining a first interior volume within which the first rotating member and the first plurality of coils are positioned. The coils of the first plurality of coils may extend radially inward from the first housing. Additionally, the first housing may create an airtight seal facilitating creating a vacuum within the first interior volume.

In some embodiments, the first rotational member may comprise a spherical structure. The first plurality of permanent magnets may be positioned on an exterior surface of the spherical structure. Additionally, the first plurality of location-defining elements may be positioned on the exterior surface of the spherical structure. Furthermore, the energy storage apparatus may further comprising a first housing comprising a spherical outer wall and a plurality of recesses extending radially outward from the spherical outer wall within which the first plurality of coils are positioned. The spherical outer wall may define a first interior volume within which the first rotating member is positioned. Additionally, the first housing may create an airtight seal facilitating creating a vacuum within the first interior volume.

In some embodiments the controller may be operable to define a rotational orthodrome of the first rotating member, identify a first subset of coils of the first plurality of coils proximate to the rotational orthodrome, defining first orthodrome coils, and identify a second subset of the first plurality of coils proximate to the rotational axis, defining first bearing coils. The controller may further be operable to increase energy stored by the first rotating member by selectively operating the first orthodrome coils to generate magnetic fields that interact with permanent magnets proximate to the rotational orthodrome comprised by the first rotating member to increase the rotational speed of the first rotating member. Additionally, the controller may be further operable to withdraw energy from the first rotating member by directing current induced in the orthodrome coils by the rotation of the first plurality of permanent magnets to a power delivery location. Furthermore, the controller may be operable to selectively operate the bearing coils to generate a magnetic field to resist a gyroscopic force exerted by the rotation of the first rotating member. The controller may further be operable to redefine the first orthodrome coils and the first bearing coils responsive to a change in at least one the rotational axis of the first rotating member and an absolute orientation of the first plurality coils.

In some embodiments the first rotating member may be positioned at a first location on a vessel, the energy storage apparatus further comprising a second rotating member positioned at a second location on the vessel, comprising a second plurality of permanent magnets distributed to define an outer geometry of the rotating member conforming to a spherical shape and a second plurality of location-defining elements, each location-defining element being uniquely identifiable. The energy storage apparatus may further comprise a second plurality of coils arranged to define a generally spherical shape surrounding the first rotating member and a second location sensing apparatus operable to detect the second plurality of location-defining elements. The controller may be operable to define the rotation of the second rotating member as a combination of rotation about the three rotational axes and to compare time-sequential information from the second location sensing apparatus to determine a rotational speed of the second rotating member across the rotational axes. Additionally, the controller may be further operable to receive an energy change request defining a total amount of energy to one of withdraw and deposit from the energy storage apparatus, determine a change of the rotational speeds of each of the first and second rotating members that will one of generate electricity and deposit energy to satisfy the energy change request, defining an energy change protocol, and operate the first and second pluralities of coils responsive to the energy change protocol. The change in rotational speed for each of the first and second rotating members may exert a torque on the vessel, and the controller may be operable to determine the energy change protocol such that the torques resulting from the change in rotational speed for the first and second rotating members cancel, resulting in no net change of a rotational speed of the vessel. Additionally, the controller may be further operable to receive a reorientation request defining a change in an angular orientation of the vessel, determine a change in the rotational speed of at least one of the first and second rotating members that will generate a torque to effectuate the change in angular orientation of the reorientation request, defining an orientation change protocol, and operate the first and second pluralities of coils responsive to the orientation change protocol. Operating the first and second pluralities of coils responsive to the orientation change protocol may comprise operating at least one of the first and second pluralities of coils to effectuate a first change in the torque exerted by at least one of the first and second rotating members on the vessel to cause a change in the rotational speed of the vessel, and operating at least one of the first and second pluralities of coils to effectuate a second change in the torque exerted by at least one of the first and second rotating members on the vessel to maintain the angular orientation of the vessel defined by the reorientation request.

Furthermore, the controller may be operable to receive an energy change request defining a total amount of energy to one of withdraw and deposit from the energy storage apparatus, receive a reorientation request defining a change in an angular orientation of the vessel, determine a change of the rotational speeds of each of the first and second rotating members that will one of generate electricity and deposit energy to satisfy the energy change request and that will generate a torque to effectuate the change in angular orientation of the reorientation request, defining a combination change protocol, and operate the first and second pluralities of coils responsive to the combination change protocol.

Further embodiments of the present invention are directed to a method of operating an energy storage apparatus comprising receiving a plurality of time-sequential measurements from a location sensing apparatus indicating a rotational position of a rotating member, determining a rotational axis and rotational speed of the rotating member from a comparison of the plurality of time-sequential measurements, and selectively operating a plurality of coils to change independently to generate magnetic fields that interact with a plurality of permanent magnets comprised by the rotating member to change each of the rotational axis and the rotational speed of the rotating member. The method further comprises increasing energy stored by the rotating member by increasing the rotational speed of the rotating member by selectively operating the plurality of coils to generate magnetic fields that interact with the permanent magnets comprised by first rotating member to increase the rotational speed of the rotating member and withdrawing energy from the first rotating member by selectively operating the plurality of coils to generate magnetic fields that interact with the permanent magnets to produce an induced current in the plurality of coils and directing the induced current to a power delivery location.

In some embodiments, the method may further comprise defining a rotational orthodrome of the rotating member, identifying a first subset of coils of the plurality of coils proximate to the rotational orthodrome, defining orthodrome coils; and identifying a second subset of first plurality of coils proximate to the rotational axis, defining bearing coils. The method may further comprise increasing energy stored by the rotating member by selectively operating the orthodrome coils to generate magnetic fields that interact with the permanent magnets proximate to the rotational orthodrome comprised by the rotating member to increase the rotational speed of the rotating member and withdrawing energy from the first rotating member by directing current induced in the orthodrome coils by the rotation of the plurality of permanent magnets to a power delivery location, generating a torque on the energy storage apparatus by selectively operating the bearing coils to generate a magnetic field to resist a gyroscopic force exerted by the rotation of the rotating member, and redefining the orthodrome coils and the bearing coils responsive to a change in at least one the rotational axis of the rotating member and an absolute orientation of the plurality coils.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a rotating apparatus for the storage of energy. The apparatus may comprise a housing, a rotating member comprising a plurality of permanent magnets attached to a rotating member, a plurality of electromagnets surrounding the rotating member, a power source connected to the plurality of electromagnets, and a controller configured to individually operate the plurality of electromagnets. The energy storage apparatus may be used in stationary or movable ground-based implementations, in aircraft, in watercraft, and in spacecraft.

Figure 1:
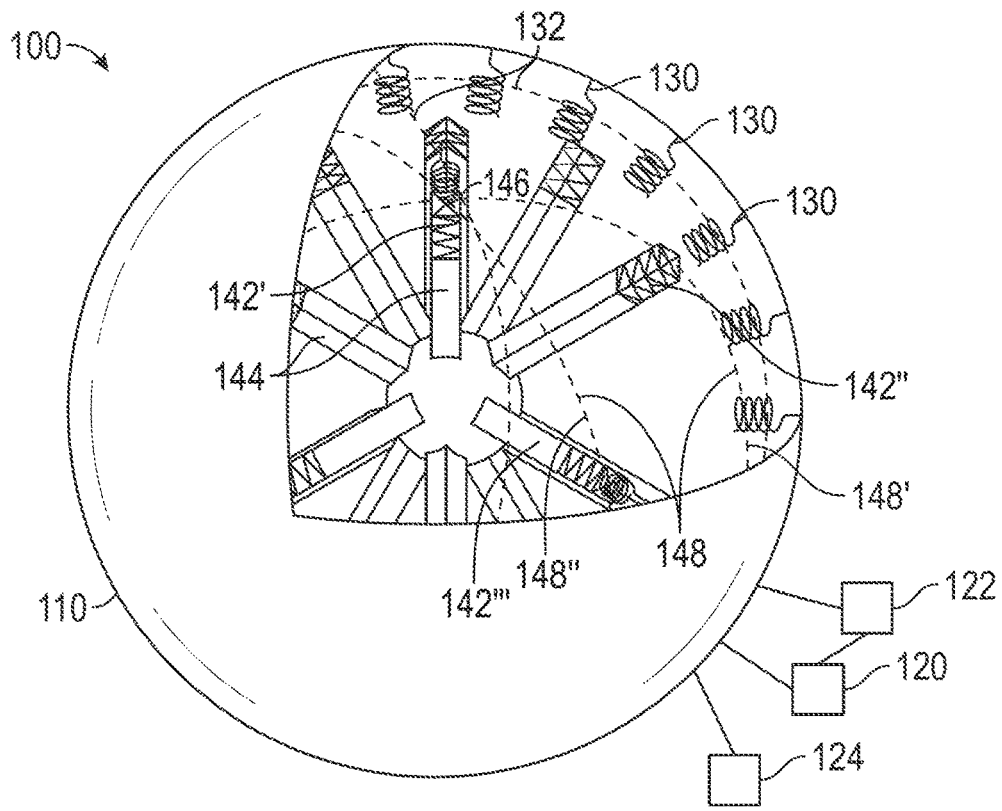
FIG. 1 is a perspective sectional view of an energy storage apparatus according to an embodiment of the invention.
Figure 2:
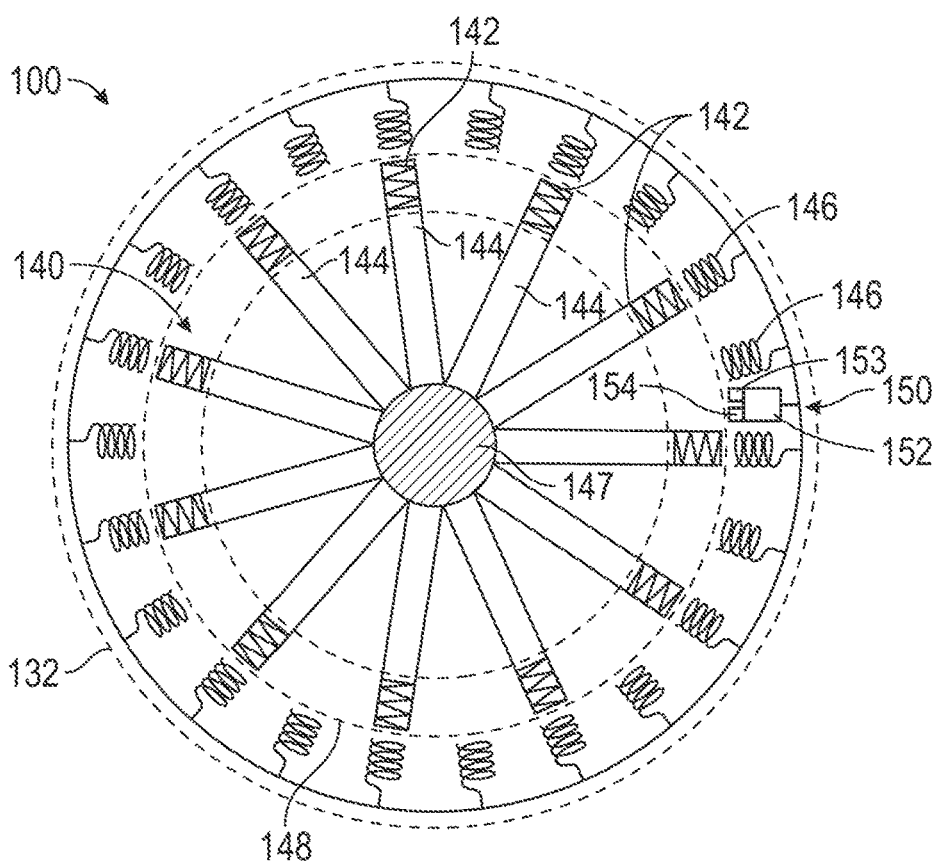
FIG. 2 is a side sectional view of the energy storage apparatus of FIG. 1.
Figure 3:
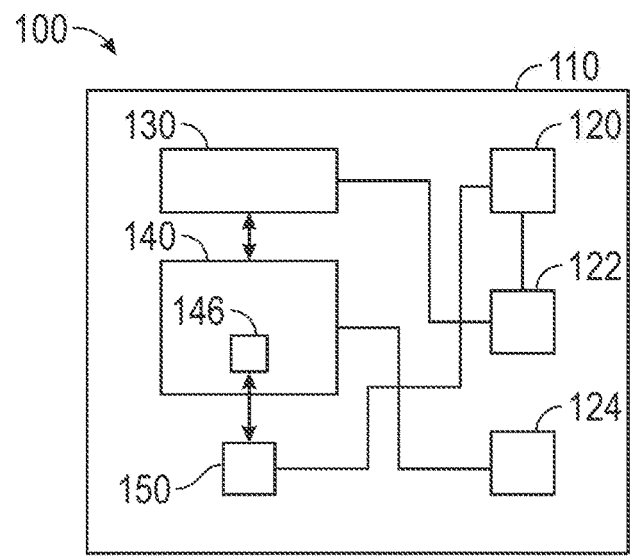
FIG. 3 is a schematic view of the energy storage apparatus of FIG. 1.

Referring now to FIGS. 1-3, an energy storage apparatus 100 according to an embodiment of the invention is presented. The energy storage apparatus 100 may comprise a housing 110, a controller 120, a power source 122 operably coupled to the controller 120, and a plurality of coils 130 operable coupled to the controller 120 and the power source 122 such that the controller 120 may operate the plurality of coils 130 to alternatively generate a magnetic field and to permit current to be induced within at least one of the plurality of coils 130, said current being transmitted away from the plurality of coils 130 to one of the power source 122 or a power delivery location external the energy storage apparatus 100. Furthermore, the housing 110 may be configured to seal an interior volume thereof from the environment surrounding the housing 110. In some embodiments, the housing 110 may be configured to provide a vacuum environment in the interior volume. The energy storage apparatus 100 may further comprise a rotating member 140 and a location sensing apparatus 150 positioned in communication with the controller 120 and configured to transmit rotational position information about the rotating member 140 to the controller 120.

The controller 120 may be any device capable of operating the plurality of coils 130 and the location sensing apparatus 150 as described herein. Such devices include, but are not limited to, computing devices, including processors, microprocessors, field programmable gate assemblies (FPGAs), integrated circuits (ICs), and the like. The controller 120 may be configured to store instructions related to the operation of the plurality of coils 130, interpreting inputs from the location sensing apparatus 150 and determining the rotational characteristics of the rotating member 140. Accordingly, the controller 120 may further comprise data storage hardware, including transitive and non-transitive storage media, including memory such as RAM, DRAM, and the like, as well as potentially including a hard drive, a solid state drive, a flash drive, a Secure Digital (SD) card, and the like. The controller 120 may be any device capable of interpreting information and executing commands as described herein.

The plurality of coils 130 may be positioned within the housing 110. The positioning of the plurality of coils 130 may define a bounded volume. The rotating member 140 may be positioned thin the bounded volume defined by the plurality of coils 130. The rotating member 140 may comprise a plurality of permanent magnets 142. The plurality of permanent magnets 142 may be positioned in a regular or non-regular distribution. The plurality of permanent magnets 142 may coordinate to define a physical shape of the rotating member 140. In some embodiments, the rotating member 140 may have a generally spherical configuration, i.e. the positioning of the plurality of permanent magnets 142 may be consistent with a spherical shape, e.g. partially defining a spherical surface, although areas between adjacent permanent magnets 142 may or may not be occupied by a structure of the rotating member 140 or any other elements of the energy storage apparatus 100.

In the present embodiments, the rotating member 140 may comprise a plurality of arms 144. The plurality of arms 144 may be joined at a center 147 of the rotating member 140 and extend radially outward. The plurality of permanent magnets 142 may be positioned at or near the outer end of the plurality of arms 144. Moreover, the plurality of permanent magnets 142 may be positioned such that the magnetic field generated thereby is oriented such that one of the positive pole or the negative pole is oriented radially outward relative to the end of the arm of the plurality of arms 144 the permanent magnet is positioned upon, and the other pole is oriented radially inward. Moreover, the plurality of permanent magnets 142 may be positioned such that the same pole (i.e. all of the positive or negative poles) are oriented radially outward and the same pole (i.e. the other pole of the magnet) is oriented radially inward. For example, the magnets may be oriented such that all of the south poles of the magnets are oriented radially outward, or such that all of the north poles of the magnets are oriented radially outward.

The plurality of arms 144 may be formed of a material having a relatively high strength-to-weight ratio, such as carbon fiber. Reducing the weight may enable the rotating member 140 to rotate at higher speeds, compared to if heavier materials were used, thereby increasing the weight thereof. In some embodiments, the rotating member 140 may be configured to be rotated at a maximum rotational rate within a range from 20,000 revolutions per minute (RPM) to 40,000 RPM. In the present embodiment, the rotating member 140 may be configured to rotate at up to 30,000 RPM.

The rotating member 140 may further comprise a plurality of location-defining elements 146. The plurality of location-defining elements 146 may be elements configured to indicate a rotational location of the rotating member 140. The plurality of location-defining elements 146 may be configured to be sensed, detected, read, or otherwise convey the indication of rotational location of the rotating member 140 to the location sensing apparatus 150. More specifically, the location sensing apparatus 150 may comprise one or more location-sensing devices 152 configured to sense a location-defining element of the plurality of location-defining elements 146 and transmit rotational location information to the controller 120 responsive to the sensed location-defining element. Any type of location-defining element and location-sensing device as is known in the art is contemplated and included within the scope of the invention, including, but not limited to, an optical-indicating location defining element and an optical-sensing device, such as a LASER-emitting and sensing device whereby the reflection of a LASER emitted by an electromagnetic radiation (EMR) emitting device 153 comprised by the location-sensing device 152 of a location-defining element 146 may be sensed by an optical sensor 154 comprised by the location-sensing device 152 may generate rotational location information for the rotating member 140, i.e. what location of the rotating member 140 is within a field of view of the location-sensing device 152. This information may be transmitted to the controller 120 which may collect this type of information from all location-sensing devices 152 of the location sensing apparatus 150 to determine a rotational position of the rotating member 140. Moreover, the controller 120 may further be configured to compare time-sequential information from the location sensing apparatus 150 to determine a rotational speed of the rotating member 140 by determining the length of time it takes for one or more location-defining elements 146 to traverse between location-sensing devices 152, such traversal having a known rotational distance. While a single location sensing apparatus 150 is shown in FIG. 2, any number of such apparatuses is contemplated and included within the scope of the invention.

The plurality of permanent magnets 142 may be positioned at regular intervals, i.e. having an equal angle formed between adjacent magnets. For example, an angle formed between adjacent between a first permanent magnet 142' and a second permanent magnet" of the plurality of permanent magnets 142 may be equal to the angle formed between the second permanent magnet 142" and a third permanent magnet 142'" of the plurality of permanent magnets 142 and the first and third permanent magnets 142', 142'". Additionally, the plurality of permanent magnets 142 may be positioned to define a plurality of orthodromes 148, i.e. a plane passing through the center point of the sphere shape of the rotating member 140. The angular distance between permanent magnets defining each orthodrome may be equal for each orthodrome, i.e. the angle between the first and second permanent magnets 142', 142" that partially define a first orthodrome 148' may be equal to the angle between the first and third permanent magnets 142', 142'" partially defining a second orthodrome 148".

The plurality of coils 130 may be positioned so as to cooperate with the positioning of the plurality of permanent magnets 142. More specifically, the plurality of coils 130 may be positioned to define a plurality of coil orthodromes 132. The plurality of coil orthodromes 132 may be greater than or equal to the number of the plurality of orthodromes 148 of the rotating member 140. Having a greater number of coil orthodromes 132 may enable greater control over the position and rotation of the rotating member 140. Accordingly, in some embodiments, the ratio of coil orthodromes to permanent magnet orthodromes may be within a range from 2:1 to 4:1. In some embodiments, the ratio may be 3:1. Accordingly, the ratio of coils to permanent magnets may have a similar ratio, e.g. in some embodiments the ratio being within a range from 2:1 to 4:1, and in some embodiments the ratio being 3:1.

The plurality of coils 130 may be selectively energized to accomplish a number of objectives, including suspension of the rotating member 140 within the volume bounded by the plurality of coils 130, the increase in rotational rate of the rotating member 140 for the storage of energy, the decrease in rotational rate of the rotating member 140 for the withdrawal of energy, and the realignment of the rotating member 140 relative to the plurality of coils 130. Additionally, the plurality of coils 130 may be selectively energized to change the direction of rotation of the rotating member 140 to change the direction of torque generated by the rotation of the rotating member 140.

The rotation of the rotating member 140 stores energy in the form of kinetic energy. The total kinetic energy stored in the rotating member 140 may be approximated as the kinetic energy of a thin sphere, which may be determined by the equation $$K_\omega = \tfrac{1}{2} I \omega^2 \qquad \text{Equation 1:}$$

where $K_\omega$ is kinetic energy, I is the mass moment of inertia, which is defined the equation $$I = \tfrac{2}{3} m r^2 \qquad \text{Equation 2:}$$

where m is the mass of the sphere and r is the radius of the sphere, and where $\omega$ is the rotational velocity of the sphere, which is defined by the equation $$\omega = 2\pi f \qquad \text{Equation 3:}$$

where f is the rotational frequency in revolutions per second.

Accordingly, the controller 120 may determine the energy stored by the rotating member 140 at any given moment using Equations 1-3. When energy needs to be stored or withdrawn from the rotating member 140, the controller 120 may determine what change in the rotational velocity of the rotating member 140 is necessary to produce a change in the kinetic energy of the rotating member 140. The efficiency in converting the kinetic energy of the rotating member 140 to electricity will have a coefficient such that the energy of the electricity produced will be less than the kinetic energy withdrawn from the rotating member 140, and vice versa for the electricity used in increasing the kinetic energy of the rotating member 140 for energy storage.

Figure 4A:
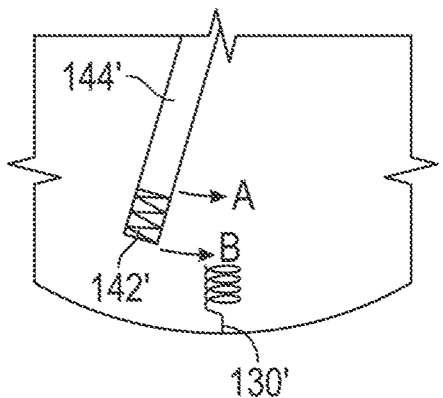
FIGS. 4A-B illustrate a method of increasing the rotational speed of a rotating member of an energy storage apparatus for energy storage according to an embodiment of the invention.
Figure 4B:
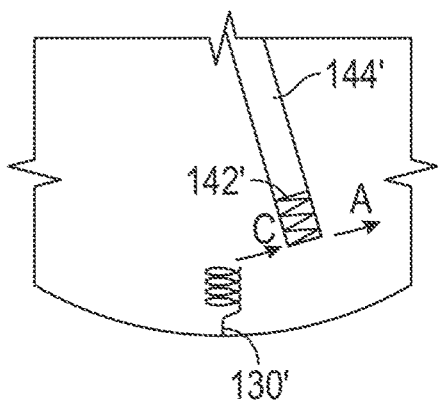

Referring now additionally to FIGS. 4A-B, a method of storing energy in the rotating member 140 is depicted. Interaction between a magnetic field generated by a first coil 130' of the plurality of coils 130 and the first permanent magnet 142' may increase the rotational speed of a first arm 144' of the plurality of arms 144 which comprises the first permanent magnet 142'. The first arm 144' may have a rotational direction A and velocity such that the first permanent magnet 142' is approaching the first coil 130'. This may be determined by the controller 120 via information provided by the location sensing apparatus 150. As shown in FIG. 4A, the controller 120 may operate the first coil 130' to generate a magnetic field that is operable to attract B the pole of the magnetic field generated by the first permanent magnet 142' that is directed radially outward, i.e. the polarity of the field generated by the first coil 130' radially inward relative to the rotating member 140 is opposite the polarity of the first permanent magnet 142' that is radially outward. As the first permanent magnet 142' approaches the first coil 130', the magnetic attraction to the magnetic field generated by the first coil 130' will accelerate the first arm 144', any by extension the entire rotating member 140.

Additionally, as shown in FIG. 4B, once the first arm 144' has traversed past the first coil 130', the controller may change the flow of electricity through the first coil 130' such that the polarity of the field generated by the first coil 130' is reversed, with the polarity of the field generated by the first coil 130' that is directed radially inward may be the same polarity of the pole of the magnetic field of the first permanent magnet 142' that is directed radially outward. This will further accelerate the first arm 144' by repelling C the first permanent magnet 142' from the first coil 130' in the direction of rotation of the first arm 144'.

While FIGS. 4A-B show the interaction between a single coil-permanent magnet pair, it is contemplated that such interactions may be occurring between multiple coil-permanent magnet pairs simultaneously.

Figure 5:
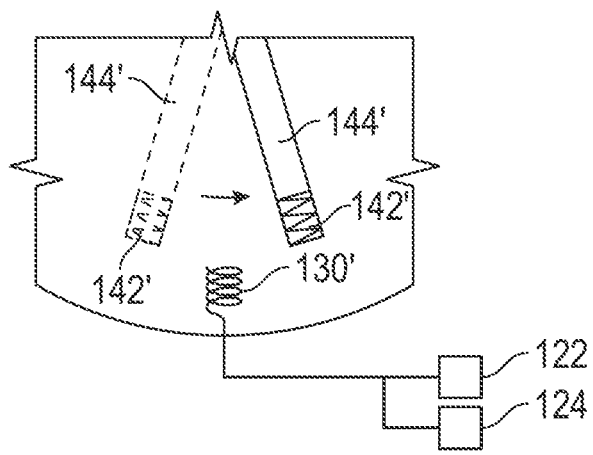
FIG. 5 illustrates a method of decreasing the rotational speed of a rotating member of an energy storage apparatus for energy withdrawal according to an embodiment of the invention.

Referring now additionally to FIG. 5, a method of withdrawing energy from the rotating member 140 is depicted. Interaction between the movement of the magnetic field generated by the first permanent magnet 142' and the current induced in the first coil 130'. As the first arm 144' rotates towards and then away from the first coil 130', the magnetic field of the first permanent magnet 142' from the perspective of the first coil 130', strengthening and weakening as the first permanent magnet 142' rotates towards and then away from the first coil 130', induces a current in the first coil 130'. Such induced current may be fed through a conductor to one of the power source 122 and the power delivery location, such as a battery 124 or any other electricity storage device as is known in the art, including one or more ultracapacitors.

Figure 6:
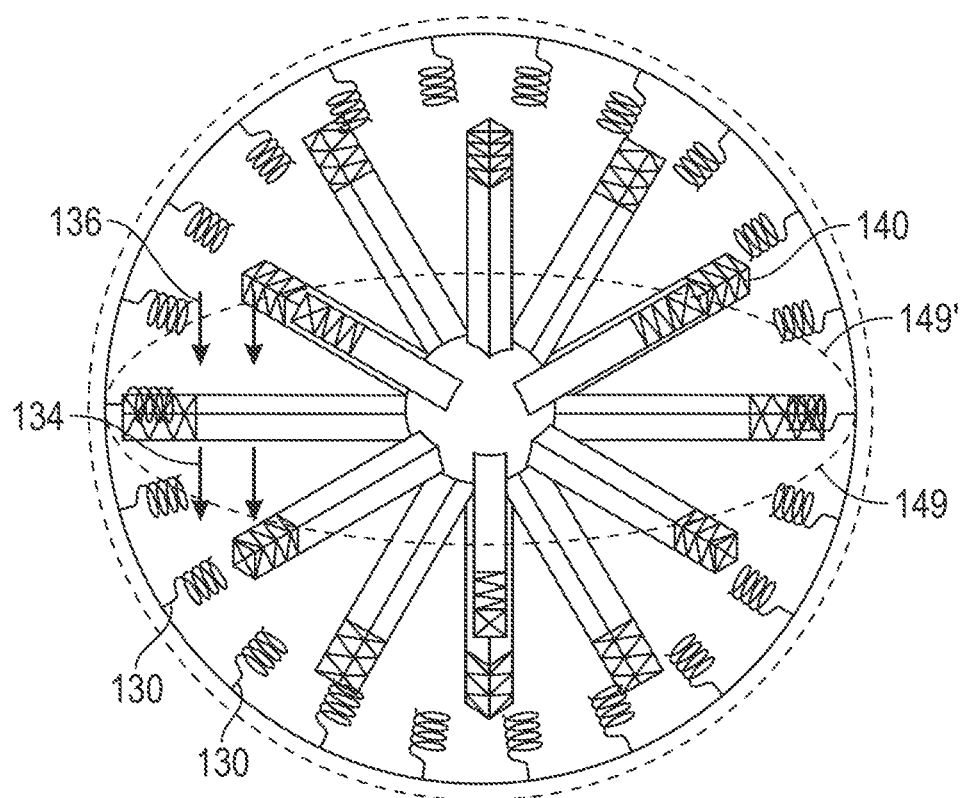
FIG. 6 illustrate a method of adjusting the rotational direction of a rotating member of an energy storage apparatus according to an embodiment of the invention.

Referring now additionally to FIG. 6, a method of changing the direction of rotation of the rotating member 140 is depicted. Due to one of many potential reasons, such as the movement of a vessel on which the energy storage apparatus 100 is positioned, the rotating member 140 may rotate in a direction that is not aligned with the plurality of coils 130. More specifically, the rotation of the rotating member 140 may be such that it is not aligned with one of the plurality of orthodromes 148 defined by the plurality of permanent magnets 142, or it may be rotating such that an orthodrome of the plurality of orthodromes 148 is not aligned with a coil orthodrome of the plurality of coil orthodromes 132. In either case, the controller 120 may be configured to operate the plurality of coils 130 to generate a magnetic field the effectuates the alteration of the direction of rotation of the rotating member 140. This may be accomplished by generating at least one of an attractive magnetic field 134 on one side of the line 149 defining the direction of rotation of the rotating member by one or more coils of the plurality of coils 130 and a repulsive magnetic field 136 on the opposite side of the line 149 by one or more coils of the plurality of coils 130. This may result in the rotation of the line 149 to a desired alignment 149'.

Figure 7A:
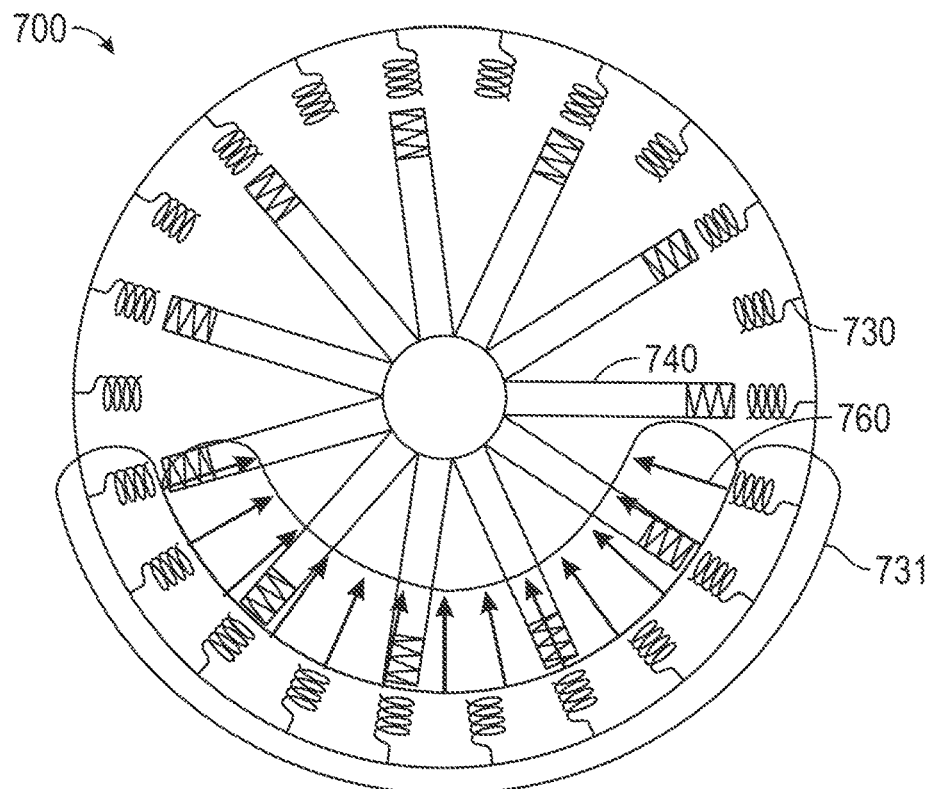
FIGS. 7A-D illustrates methods of suspending a rotating member of an energy storage apparatus according to an embodiment of the invention.
Figure 7B:
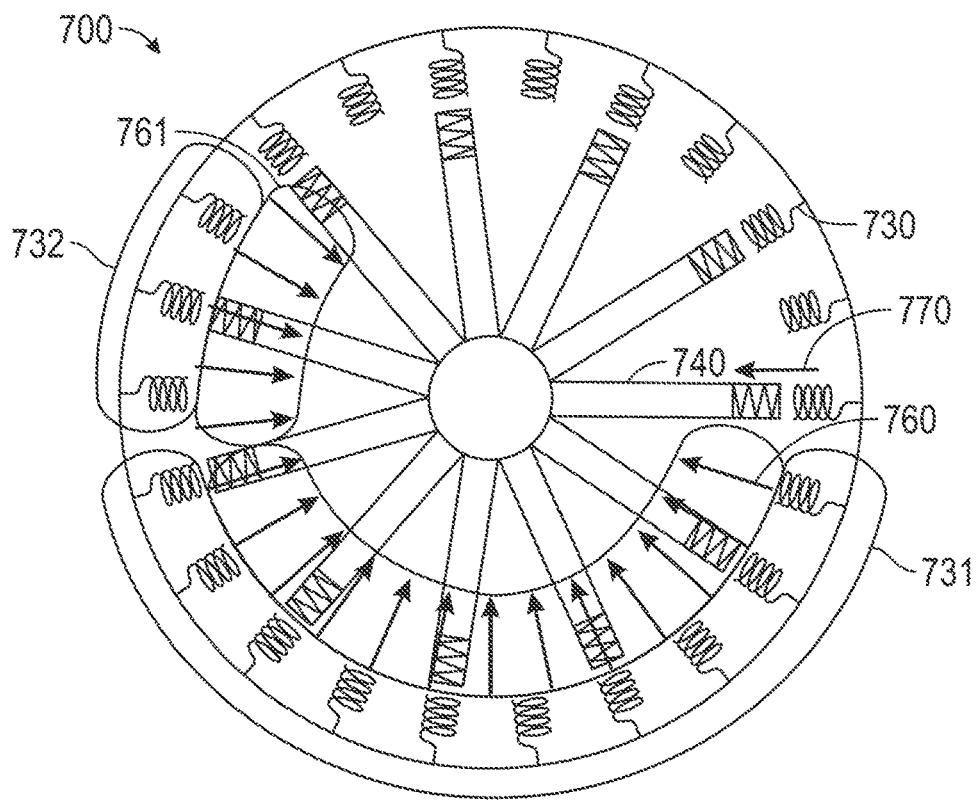

FIGS. 7A-D depict methods of suspending the rotating member 140 within the volume bounded by the plurality of coils 130 in different operating environments and scenarios. FIG. 7A depicts the plurality of coils 730 and the rotating member 740 of an energy storage apparatus 700 operating in a steady-state condition (i.e. no energy being added to or withdrawn from the rotating member 740) under normal gravity. A subset 731 of the plurality of coils 730 are generating a combined magnetic field 760 operable to suspend the rotating member 740 within the volume bound by the plurality of coils 730. FIG. 7B depicts the energy storage apparatus 700 where a force 770 other than gravity is exerted upon the rotating member 740 (e.g. the vessel on which the energy storage apparatus 700 is positioned is located turning, an earthquake, etc.). Responsive to the linear acceleration of the rotating member 740 resulting from the force 770. A second subset of coils 732 of the plurality of coils 730 may generate a counteracting combined magnetic field 761 operable to repel the rotating member 740 away from the second subset of coils 732 and back toward a center point of the volume bounded by the plurality of coils 730. The counteracting combined magnetic field 761 is generated in addition to the combined magnetic field 760 operable to counteract the force of gravity upon the rotating member 740.

Figure 7C:
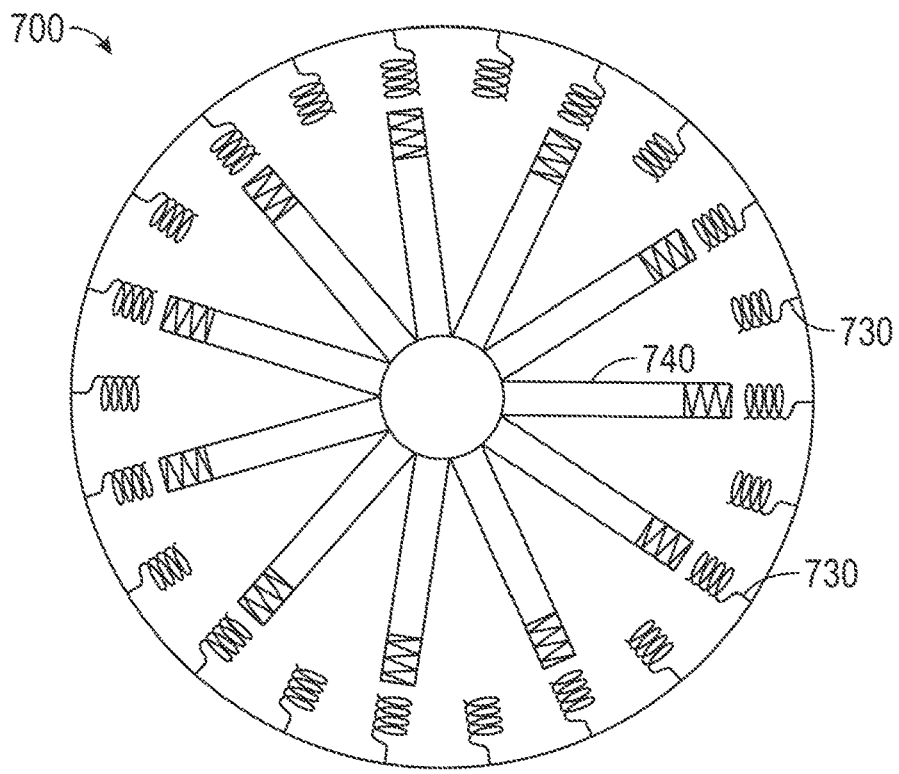
Figure 7D:
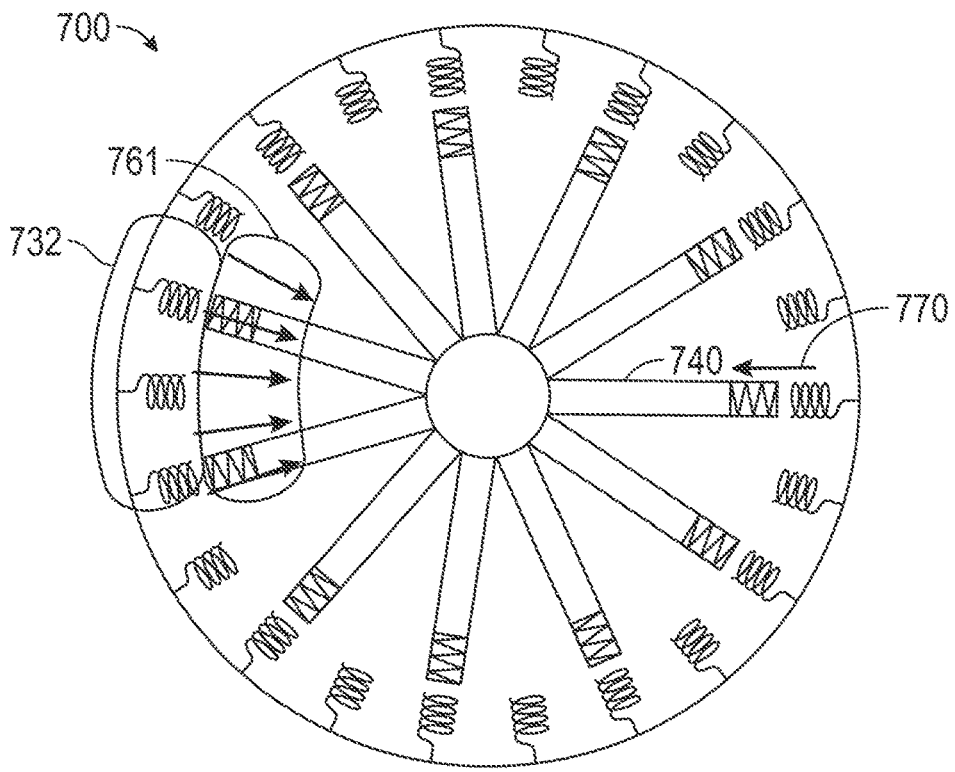

FIG. 7C depicts the energy storage apparatus 700 operating in zero-gravity environment (e.g. in a satellite orbiting the earth). In steady-state operation, the plurality of coils 730 generate no magnetic field, as there are no external forces acting upon the rotating member 740. FIG. 7D depicts the energy storage apparatus 700 where an external force 771 is exerted upon the rotating apparatus, similar to the force 770 exerted in FIG. 7B. The second subset of coils 732 may generate a counteracting combined magnetic field 761 operable to repel the rotating member 740 away from the second subset of coils 732 and back toward the center point of the volume bounded by the plurality of coils 730.

Figure 8:
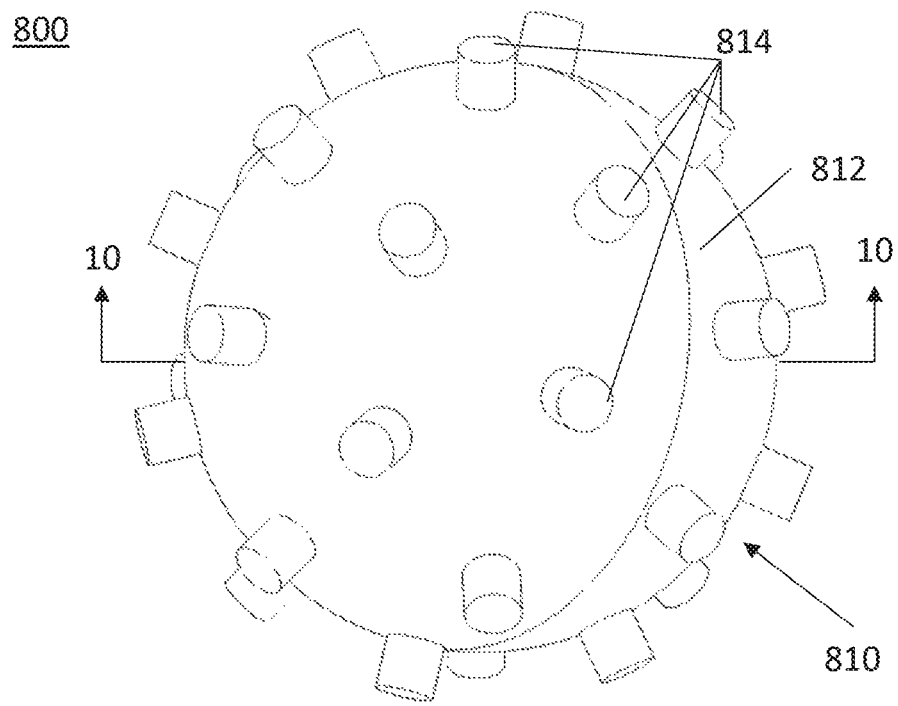
FIG. 8 is a perspective view of an energy storage apparatus according to an embodiment of the invention.
Figure 9:
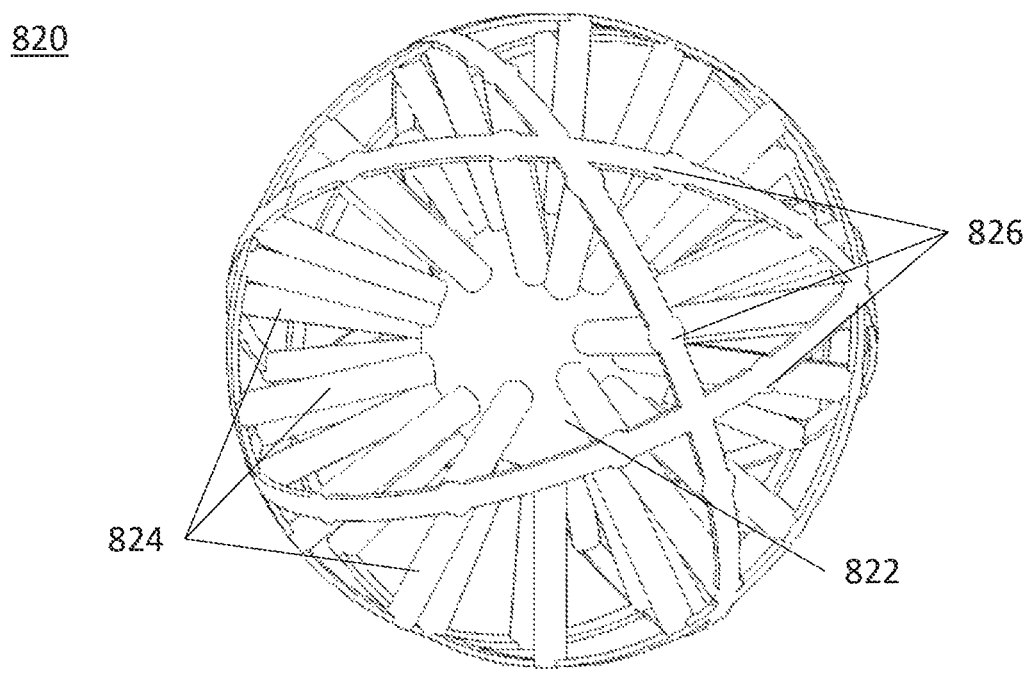
FIG. 9 is a perspective view of a rotating member of the energy storage apparatus of FIG. 8.
Figure 10:
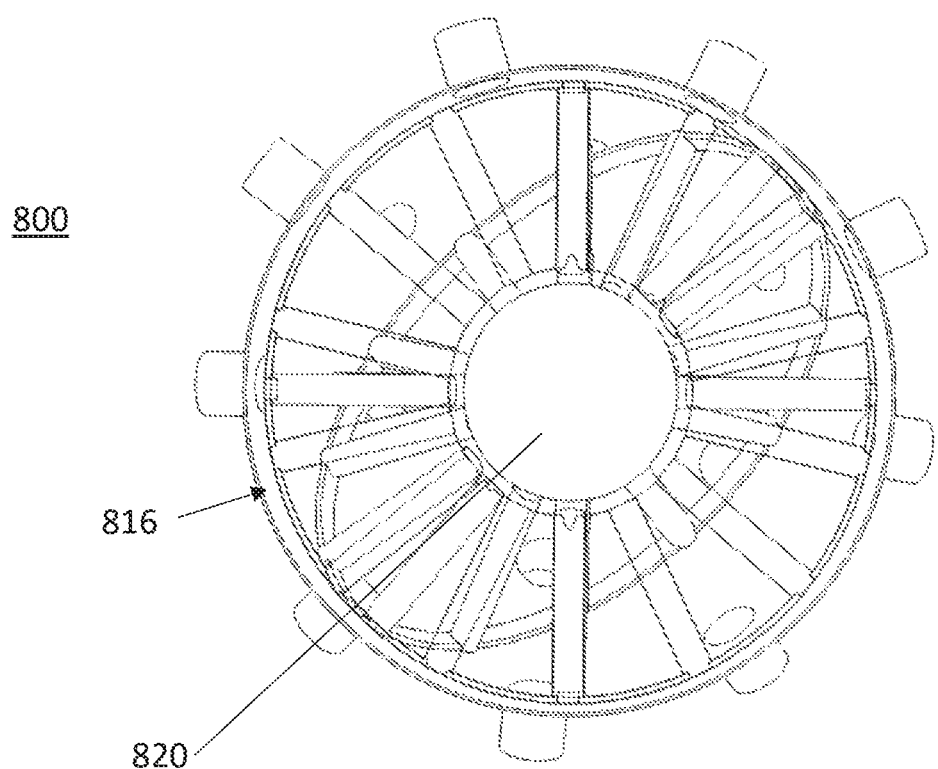
FIG. 10 is a front sectional view of the energy storage apparatus of FIG. 8 taken through line 10-10

Referring now to FIGS. 8-10, an energy storage apparatus 800 according to an embodiment of the invention is presented. The energy storage apparatus 800 may comprise a housing 810 having a spherical outer wall 812 and a plurality of recesses 814 extending radially outward from the spherical outer wall 812. The plurality of recesses 814 may be configured to permit the plurality of coils (not shown) to be positioned there within. The housing 810 may create an airtight seal such that a vacuum may be established within an interior volume 816 defined by the housing 810. In some embodiments, the housing 810 may comprise to hemispherical sections that can be attached together to define the housing 810, further facilitating establishment of a vacuum within the interior volume 816.

While not shown, the energy storage apparatus 800 may comprise a controller, a power source, a power delivery location, and a location sensing apparatus as described in the embodiments above.

The energy storage apparatus 800 may further comprise a rotating member 820 positioned within the interior volume 816 of the housing 810. Similar to the rotating members described hereinabove, the rotating member 820 may comprise a center member 822 and a plurality of arms 824 extending radially outward from the center member 822, such that one end of the arms 824 are attached to the center member 822. Similar to the rotating members described above, the rotating member 820 may comprise permanent magnets (not shown) positioned at the end of the arms opposite the ends attached to the center member 822. The rotating member 820 may further comprise structural support members 826 attached to the radially outward ends of the plurality of arms 824. The structural support members 826 may improve the structural integrity of the rotating member 820. For example, the structural support members 826 may prevent or resist the flexure of the plurality of arms 824 as the rotational speed of the rotating member 820 increase or decreases, or if the rotating member 820 changes its rotational axis. In some embodiments, the location-defining elements (not shown) may be positioned on a radially outward surface of the structural support members 826.

Figure 11:
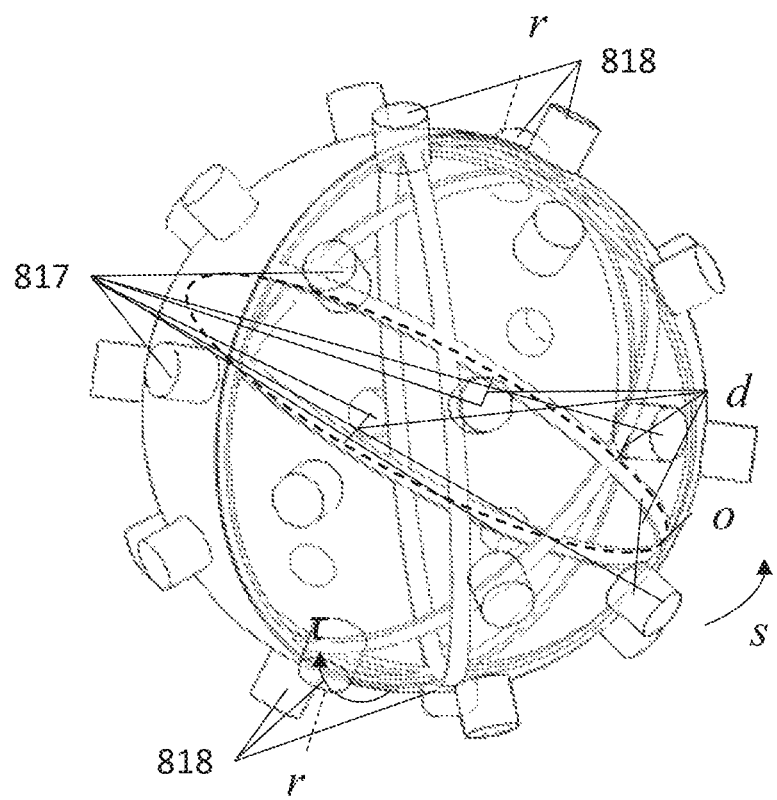
FIG. 11 is a perspective view of the energy storage apparatus of FIG. 8 wherein one hemisphere of a housing of the energy storage apparatus is transparent.

In some embodiments, the controller may be operable to identify bearing coils and orthodrome coils. Bearing coils may be understood as coils proximate to a rotational/perpendicular axis of the rotating member 820. Orthodrome coils may be understood as those coils that are proximate to a rotational orthodrome of the rotating member 820. Referring specifically to FIG. 11, The rotating member 820 may have a rotational axis r and a rotational orthodrome o.

In some embodiments, the controller may identify each of the bearing coils and the orthodrome coils. As mentioned above, as the plurality of permanent magnets of the rotating member 820 rotate past the plurality of coils, they will induce a pulsed current in the coils. The coils having the largest magnitude electrical pulse necessarily indicate the rotational orthodrome o. Conversely, the coils having the lowest or no electrical pulse indicate low-rotational elements the and hence the rotational axis r. Accordingly, the controller may be operable to measure the magnitude of induced current from the plurality of coils and, responsive to the measured induced current, define a first subset of the plurality of coils proximate to the rotational orthodrome o as the orthodrome coils, housed in recesses 817, and a second subset of the plurality of coils proximate to the rotational axis r as the bearing coils, housed in recesses 818. In some embodiments, current measuring devices may be attached to measure the current induced in the coils and connected to the controller to provide information about the magnitude of the current to the controller. In some embodiments, the controller may be operable to infer the rotational axis r and the rotational orthodrome o from the information received from a location sensing apparatus as described hereinabove.

The controller may withdraw energy from the rotating member 820 by directing current induced in the plurality of coils, primarily the orthodrome coils, by the rotation of the permanent magnets past the coils to a power delivery location.

The controller may increase the energy stored in the rotating member by selectively operating the orthodrome coils to increase the rotational speed of the rotating member 820 to generate magnetic fields to interact with the plurality of permanent magnets of the rotating member 820 along the rotational orthodrome o as described hereinabove. In some embodiments, the controller may not operate the bearing coils when operating the orthodrome coils. In such instances, as the coils interact with the permanent magnets of the rotating member to increase the rotational speed of the rotating member 820 in rotational direction s, the offset distance d from the orthodrome coils from the rotational orthodrome o results in a torque being exerted on the rotating member 820. A concordant gyroscopic torque $\tau$ results from this, causing the rotating member 820 to rotate in the direction of $\tau$ or $-\tau$, depending on the magnitude of the offsets d of the orthodrome coils. By not operating the bearing coils, the rotational axis r will change as a result of torque T. Accordingly, the controller may further be able to determine new bearing and orthodrome coils as a result in the change of rotational axis o and the concordant change in rotational orthodrome o.

In some embodiments, the controller may be operable to operating the bearing coils to resist the effect of torque $\tau$ on the rotating member 820. This will prevent substantive changes to the rotational axis r thereby maintaining rotational orthodrome o, thus not requiring the determination of new bearing and orthodrome coils by the controller. In such embodiments, the exertion of the counteracting force by the bearing coils will exert a force on the structure containing the energy storage apparatus, as will be discussed in greater detail hereinbelow.

Figure 12A:
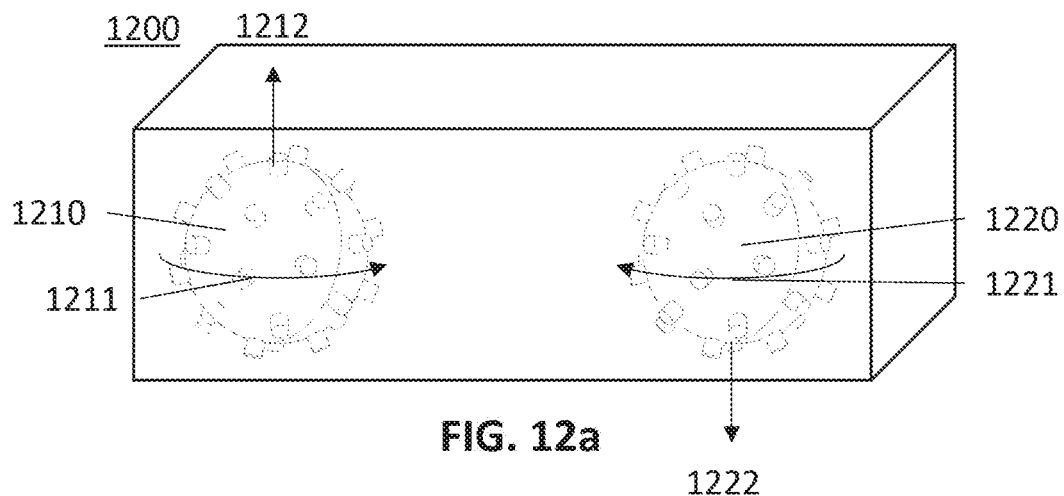
FIGS. 12a-b are views of a vessel comprising two energy storage apparatuses according to an embodiment of the invention.

Referring now to FIG. 12a, a vessel 1200 comprising an energy storage apparatus having first and second storage units 1210, 1220 comprising first and second housings, rotating members, and all other elements as described hereinabove is presented. The vessel 1200 may be any craft capable of containing the energy storage apparatus as described, including those vessels disclosed hereinabove. The first and second storage units 1210, 1220 may be controlled by a single or controller or by respective controllers positioned in communication with one another to facilitate coordination there between as will be described. The increase or withdrawal of kinetic energy of the rotating members of the first and second storage units 1210, 1220, as indicated by 1211, 1221, will cause the rotating members to exert torques 1212, 1222. As described above, operation of the bearing coils may result in exertion of a force equivalent to the torque on the vessel 1200. In this embodiment, where the storage units 1210, 1220 are fixedly attached to the vessel 1200, a clockwise rotation will be imparted to the vessel, resulting in the reorientation of the vessel 1200. Accordingly, the controller (or controllers) may selectively operate the plurality of coils of the first and second units 1210, 1220, i.e. first and second pluralities of coils of the energy apparatus, to change the rotational speed of first and second rotational members of the first and second units 1210, 1220, thereby exerting a torque on the vessel by one or both of the first and second units 1210, 1220, resulting in a change of the rotational speed (i.e. rotational direction and rotational velocity) of the vessel 1200. Such a torque will depend on the distance of the first and second units 1210, 1220 from the center of mass of the vessel 1200, which may be known by the controller. Furthermore, the controller may subsequently operate the first and second pluralities of coils to exert second torques on the vessel 1200 to affect a second change to the rotational speed of the vessel 1200, e.g. to maintain a desired angular orientation of the vessel 1200.

In some embodiments, the controller may receive a reorientation request defining a change to the angular orientation of the vessel 1200, determine a change in the rotational speed of the rotating members of at least one of the first and second units 1210, 1220 to generate the necessary torque to effectuate the requested change in angular orientation of the reorientation request. This change in rotational speed may define an orientation change protocol and may include both the initial torque to provide a first change in rotational speed in the vessel 1200 and the subsequent torque to stop the effected change in rotational speed and maintain the vessel 1200 in the desired angular orientation. The controller may operate the pluralities of coils responsive to the orientation change protocol. Such a reorientation request may be received from a computerized device in communication with the controller.

Figure 12B:
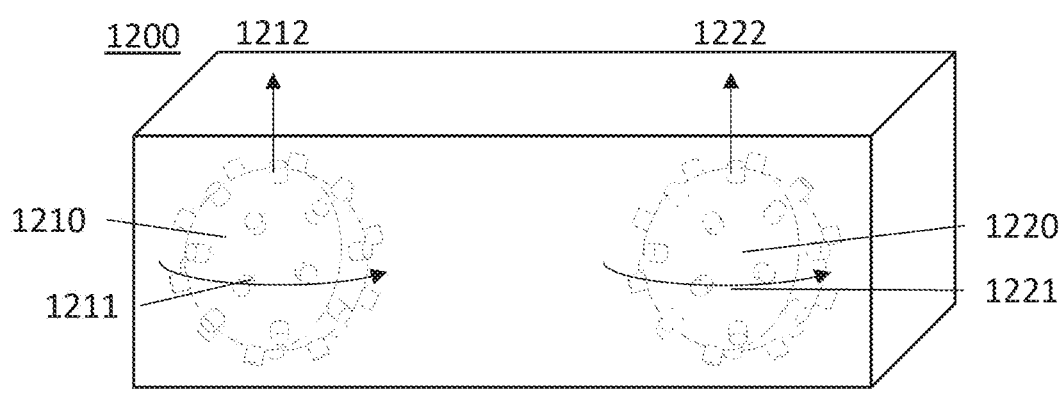

In some embodiments, the controller may receive an energy change request. Such a request may define a total amount of energy to either withdraw or deposit to the energy storage apparatus. The controller may determine a change to the rotational speed of one or both of the rotating members of the first and second units 1210, 1220, i.e. of the energy storage apparatus, defining an energy change protocol. As shown in FIG. 12b, the controller may operate at least one of first and second pluralities of coils of the first and second units 1210, 1220 responsive to the energy change protocol to change the rotational speed 1211, 1221 of the rotating members thereof to deposit or withdrawn energy therefrom. Moreover, the torques 1212, 1222 generated by the changes in rotational speed of the first and second units 1210, 1220 and acted upon the vessel 1200 may be equal and opposite, resulting in no change to the rotational speed of the vessel 1200. Such an energy change request may be received from a computerized device in communication with the controller.

In some embodiments, the controller may receive a reorientation request and an energy change request, either independently and simultaneously or as a combined request. In such embodiments, the controller may determine a change of the rotational speeds of rotating members of the first and second units 1210, 1220 that will one of generate electricity and deposit energy to satisfy the energy change request and will generate a torque to effectuate the change in angular orientation comprised by the reorientation request, defining a combination change protocol. Such a combination change protocol may be a combination of an energy change protocol and an orientation change protocol as described above, with the exception that the aspect of the energy change protocol that results in a net zero torque on the vessel 1200 is absent. The controller may the operate pluralities of coils of the first and second units 1210, 1220 responsive to the combination change protocol.

Figure 13:
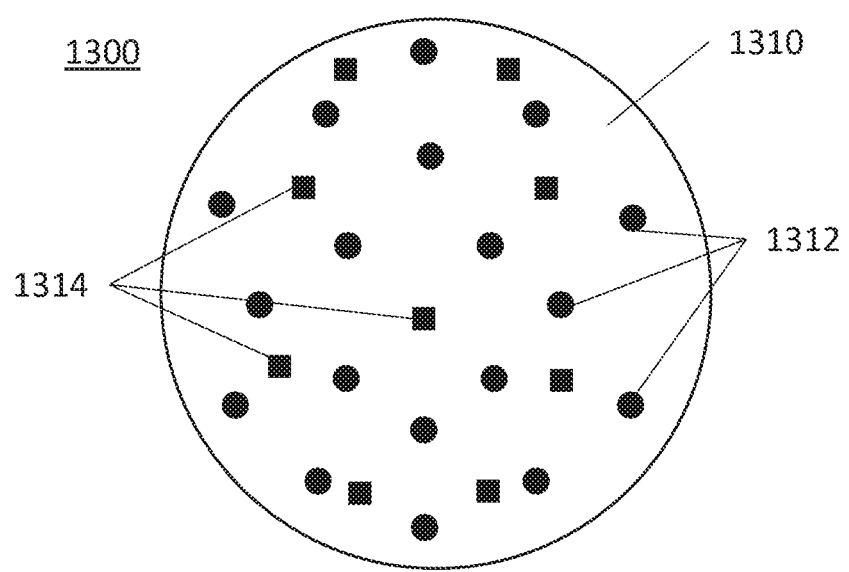
FIG. 13 is a perspective view of a rotating member according to an embodiment of the invention.

An alternative embodiment of a rotating member 1300 is shown in FIG. 13. The rotating member 1300 comprises a spherical wall 1310 having a plurality of permanent magnets 1312 embedded therein and oriented such that the same pole is oriented radially outward as described hereinabove. The rotating member 1300 may further comprise location-defining elements 1314 as described hereinabove distributed about an outer surface of the spherical wall 1310. The rotating member 1300 may include an internal support scaffold (not shown) to maintain the structural integrity of the rotating member 1300.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The invention claimed is:

1. An energy storage apparatus comprising:
   a first rotating member comprising:
      a first plurality of permanent magnets distributed to define an outer geometry of the rotating member conforming to a spherical shape; and
      a first plurality of location-defining elements, each of the first plurality of location-defining elements being uniquely identifiable;
   a first plurality of coils arranged to define a generally spherical shape surrounding the first rotating member;

a controller operably coupled to the first plurality of coils;
a power source operably coupled to the first plurality of coils; and
a first location sensing apparatus operable to detect the first plurality of location-defining elements;
wherein the controller is operable to compare time-sequential information from the first location sensing apparatus to determine a rotational axis and a rotational speed of the first rotating member as a combination of rotation about three orthogonal rotational axes;
wherein the controller is operable to selectively operate the first plurality of coils to change independently each of the rotational axis and the rotational speed of the first rotating member;
wherein the controller is operable to increase energy stored by the first rotating member by increasing the rotational speed of the first rotating member by selectively operating the first plurality of coils to generate magnetic fields that interact with the first plurality of permanent magnets comprised by first rotating member to increase the rotational speed of the first rotating member; and
wherein the controller is operable to withdraw energy from the first rotating member by selectively operating the first plurality of coils to generate magnetic fields that interact with the magnetic fields of the first plurality of permanent magnets to produce an induced current in the first plurality of coils and directing the induced current to a power delivery location.

2. The energy storage apparatus of claim 1 wherein the first rotating member comprises:
a first center member; and
a first plurality of arms, each of the first plurality of arms is attached at a respective first end to the center member and extending radially outward therefrom;
wherein each of the first plurality of arms comprises a respective one of the first plurality of permanent magnets at a respective second end opposite from the respective first end.

3. The energy storage apparatus of claim 1 wherein for each of the first plurality of arms a respective one of the first plurality of location-defining elements is positioned on a respective end surface thereof.

4. The energy storage apparatus of claim 1 further comprising a first housing defining a first interior volume within which the first rotating member and the first plurality of coils are positioned; wherein the first plurality of coils extend radially inward from the first housing; and wherein the first housing creates an airtight seal facilitating creating a vacuum within the first interior volume.

5. The energy storage apparatus of claim 1 wherein the first rotational member comprises a spherical structure; wherein the first plurality of permanent magnets are positioned on an exterior surface of the spherical structure; and wherein the first plurality of location-defining elements are positioned on the exterior surface of the spherical structure.

6. The energy storage apparatus of claim 5 further comprising a first housing comprising a spherical outer wall and a plurality of recesses extending radially outward from the spherical outer wall within which the first plurality of coils are positioned; wherein the spherical outer wall defines a first interior volume within which the first rotating member is positioned; and wherein the first housing creates an airtight seal facilitating creating a vacuum within the first interior volume.

7. The energy storage apparatus of claim 1 wherein the controller is operable to:
define a rotational orthodrome of the first rotating member;
identify a first subset of coils of the first plurality of coils proximate to the rotational orthodrome, defining first orthodrome coils; and
identify a second subset of the first plurality of coils proximate to the rotational axis, defining first bearing coils.

8. The energy storage apparatus of claim 7 wherein the controller is operable to increase energy stored by the first rotating member by selectively operating the first orthodrome coils to generate magnetic fields that interact with a first set of permanent magnets of the first plurality of permanent magnets proximate to the rotational orthodrome comprised by the first rotating member to increase the rotational speed of the first rotating member; and
wherein the controller is operable to withdraw energy from the first rotating member by directing current induced in the first orthodrome coils by the rotation of the first plurality of permanent magnets to the power deliver location.

9. The energy storage apparatus of claim 7 wherein the controller is operable to selectively operate the bearing coils to generate a magnetic field to resist a gyroscopic force exerted by the rotation of the first rotating member.

10. The energy storage apparatus of claim 7 wherein the controller is operable to redefine the first orthodrome coils and the first bearing coils responsive to a change in at least one of the rotational axis of the first rotating member and an absolute orientation of the first plurality of coils.

11. The energy storage apparatus of claim 1 wherein the first rotating member is positioned at a first location on a vessel, the energy storage apparatus further comprising:
a second rotating member positioned at a second location on the vessel, comprising:
a second plurality of permanent magnets distributed to define an outer geometry of the second rotating member conforming to a spherical shape; and
a second plurality of location-defining elements, each of the second plurality of location-defining elements being uniquely identifiable;
a second plurality of coils arranged to define a generally spherical shape surrounding the first rotating member; and
a second location sensing apparatus operable to detect the second plurality of location-defining elements;
wherein the controller is operable to define the rotation of the second rotating member as a combination of rotation about the three orthogonal rotational axes; and
wherein the controller is operable to compare time-sequential information from the second location sensing apparatus to determine a rotational speed of the second rotating member across the three orthogonal rotational axes.

12. The energy storage apparatus of claim 11 wherein the controller is operable to:
receive an energy change request defining a total amount of energy to one of withdraw and deposit from the energy storage apparatus;
determine a change of the rotational speeds of each of the first and second rotating members that will one of generate electricity and deposit energy to satisfy the energy change request, defining an energy change protocol; and
operate the first and second pluralities of coils responsive to the energy change protocol.

13. The energy storage apparatus of claim 12 wherein the change in rotational speed for each of the first and second rotating members exerts a torque on the vessel, wherein controller is operable to determine the energy change protocol such that the torques resulting from the change in rotational speed for the first and second rotating members cancel, resulting in no net change of a rotational speed of the vessel.

14. The energy storage apparatus of claim 11 wherein the controller is operable to:
receive a reorientation request defining a change in an angular orientation of the vessel;
determine a change in the rotational speed of at least one of the first and second rotating members that will generate a torque to effectuate the change in angular orientation of the reorientation request, defining an orientation change protocol; and
operate the first and second pluralities of coils responsive to the orientation change protocol.

15. The energy storage apparatus of claim 14 wherein the operating the first and second pluralities of coils responsive to the orientation change protocol comprises:
operating at least one of the first and second pluralities of coils to effectuate a first change in the torque exerted by at least one of the first and second rotating members on the vessel to cause a change in the rotational speed of the vessel; and
operating at least one of the first and second pluralities of coils to effectuate a second change in the torque exerted by at least one of the first and second rotating members on the vessel to maintain the angular orientation of the vessel defined by the reorientation request.

16. The energy storage apparatus of claim 11 wherein the controller is operable to:
receive an energy change request defining a total amount of energy to one of withdraw and deposit from the energy storage apparatus;
receive a reorientation request defining a change in an angular orientation of the vessel;
determine a change of the rotational speeds of each of the first and second rotating members that will one of generate electricity and deposit energy to satisfy the energy change request and that will generate a torque to effectuate the change in angular orientation of the reorientation request, defining a combination change protocol; and
operate the first and second pluralities of coils responsive to the combination change protocol.

17. An energy storage apparatus comprising:
a housing comprising:
a spherical outer wall defining an interior volume; and
a plurality of recesses extending radially outward from the spherical outer wall;
a rotating member positioned within the interior volume of the housing, comprising:
a spherical structure;
a plurality of permanent magnets positioned on an exterior surface of the spherical structure; and
a plurality of location-defining elements, each of the plurality of location-defining elements being uniquely identifiable;
a plurality of coils positioned within the plurality of recesses;
a controller operably coupled to the plurality of coils;
a power source operably coupled to the plurality of coils; and
a location sensing apparatus operable to detect the plurality of location-defining elements;
wherein the housing creates an airtight seal facilitating creating a vacuum within the interior volume
wherein the controller is operable to compare time-sequential information from the location sensing apparatus to determine a rotational axis, a rotational orthodrome, and a rotational speed of the rotating member;
wherein the controller is operable to identify a first subset of coils of the plurality of coils proximate to the rotational orthodrome, defining orthodrome coils;
wherein the controller is operable to identify a second subset of the first plurality of coils proximate to the rotational axis, defining bearing coils;
wherein the controller is operable to increase energy stored by the rotating member by selectively operating the orthodrome coils to generate magnetic fields that interact with a first set of permanent magnets of the plurality of permanent magnets proximate to the rotational orthodrome comprised by the rotating member to increase the rotational speed of the rotating member; and
wherein the controller is operable to withdraw energy from the rotating member by directing current induced in the orthodrome coils by the rotation of the plurality of permanent magnets to a power delivery location;
wherein the controller is operable to selectively operate the bearing coils to generate a magnetic field to resist a gyroscopic force exerted by the rotation of the rotating member; and
wherein the controller is operable to redefine the orthodrome coils and the bearing coils responsive to a change in at least one the rotational axis of the rotating member and an absolute orientation of the plurality coils.

18. A method of operating an energy storage apparatus comprising:
receiving a plurality of time-sequential measurements from a location sensing apparatus, the location sensing device detecting a plurality of location-defining elements in a uniquely identifiable manner and indicating a rotational position of a rotating member;
determining a rotational axis and rotational speed of the rotating member from a comparison of the plurality of time-sequential measurements;
selectively operating a plurality of coils to change independently to generate magnetic fields that interact with a plurality of permanent magnets comprised by the rotating member to change each of the rotational axis and the rotational speed of the rotating member;
increasing energy stored by the rotating member by increasing the rotational speed of the rotating member by selectively operating the plurality of coils to generate magnetic fields that interact with the plurality of permanent magnets comprised by the rotating member to increase the rotational speed of the rotating member; and
withdrawing energy from the rotating member by selectively operating the plurality of coils to generate magnetic fields that interact with the plurality of permanent magnets to produce an induced current in the plurality of coils and directing the induced current to a power delivery location.

19. The method of operating an energy storage apparatus of claim 18 further comprising:
defining a rotational orthodrome of the rotating member;

identifying a first subset of coils of the plurality of coils proximate to the rotational orthodrome, defining orthodrome coils; and identifying a second subset of first plurality of coils proximate to the rotational axis, defining bearing coils.

20. The method of operating an energy storage apparatus of claim 19 further comprising:

increasing energy stored by the rotating member by selectively operating the orthodrome coils to generate magnetic fields that interact with a first set of permanent magnets of the plurality of permanent magnets proximate to the rotational orthodrome comprised by the rotating member to increase the rotational speed of the rotating member; and withdrawing energy from the first rotating member by directing current induced in the orthodrome coils by the rotation of the plurality of permanent magnets to the power delivery location;

generating a torque on the energy storage apparatus by selectively operating the bearing coils to generate a magnetic field to resist a gyroscopic force exerted by the rotation of the rotating member; and redefining the orthodrome coils and the bearing coils responsive to a change in at least one the rotational axis of the rotating member and an absolute orientation of the plurality coils.

* * * * *